G. D. HAYDEN.
CAM CUTTING MECHANISM.
APPLICATION FILED MAR. 16, 1911.
1,098,038.
Patented May 26, 1914.
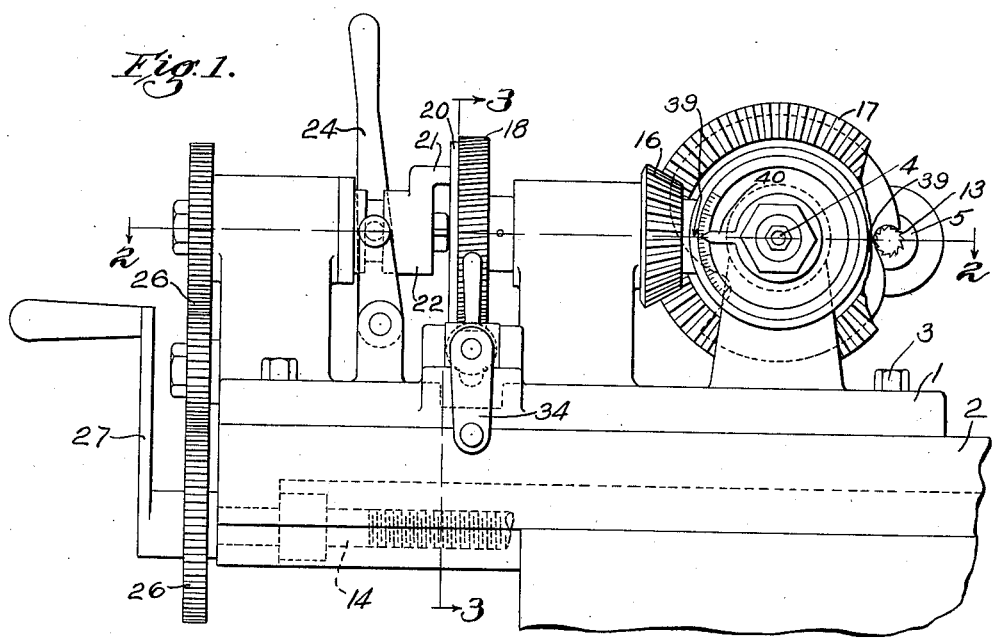
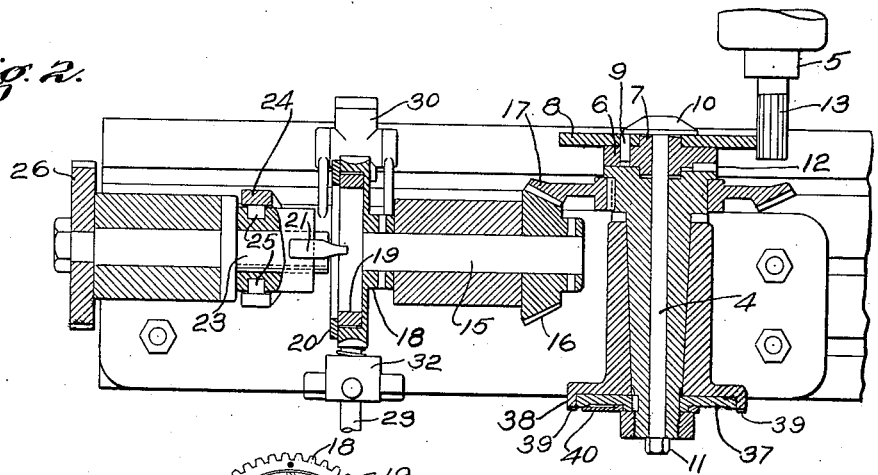
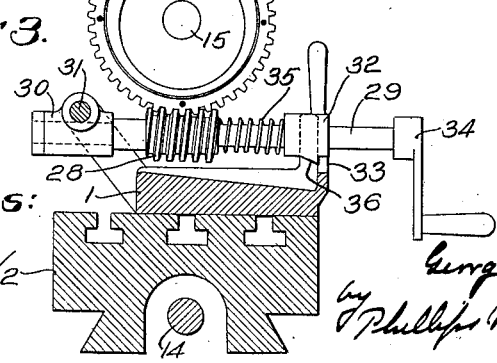
Witnesses:
M. L. Gilman
K. D. McPhail
Inventor:
George D. Hayden
by Phillips, Van Everen & Fish
Attys

UNITED STATES PATENT OFFICE.

GEORGE D. HAYDEN, OF PROVIDENCE, RHODE ISLAND, ASSIGNOR OF ONE-TENTH TO CHARLES R. HUNT, OF NEW BEDFORD, MASSACHUSETTS.

CAM-CUTTING MECHANISM.

1,098,038.      Specification of Letters Patent.      Patented May 26, 1914.

Application filed March 16, 1911. Serial No. 614,767.

*To all whom it may concern:*

Be it known that I, GEORGE D. HAYDEN, a citizen of the United States, residing at Providence, in the county of Providence and State of Rhode Island, have invented certain new and useful Improvements in Cam-Cutting Mechanism; and I do hereby declare the following to be a full, clear, and exact description of the invention, such as will enable others skilled in the art to which it appertains to make and use the same.

The invention relates to a cam cutting mechanism, and more particularly to a mechanism which is well adapted for use as a cam cutting attachment for milling machines.

The object of the invention is to provide a simple and efficient construction which may be conveniently adjusted and operated to cut the desired rises or dwells on disk cams such as are extensively used in various machines.

To this end the invention consists in the features of construction and combination of parts hereinafter described and referred to in the claims, the advantages of which will be readily understood by those skilled in the art.

The various features of the invention will be understood from an inspection of the accompanying drawings and the following detailed description of the mechanism shown therein.

In the drawings Figure 1 is a front elevation of an attachment for milling machines embodying the invention in its preferred form, together with so much of a milling machine as is necessary to illustrate the application of the invention thereto; Fig. 2 is a horizontal sectional view on line 2—2, Fig. 1; and Fig. 3 is a vertical sectional view on line 3—3, Fig. 1.

As shown in the drawings, the attachment comprises a supporting base 1 which is adapted to be secured to the table 2 of a milling machine by T-headed bolts and nuts 3. A work carrying spindle 4 is mounted in bearings upon the base 1, and is so arranged that its axis is parallel to the cutter carrying spindle 5 of the milling machine. The inner end of the spindle 4 is provided with a removable work supporting plate 6 having a hub 7 to fit within the bore of the cam blank 8, and a pin 9 for engaging a hole in the blank and positioning it on the end of the spindle. The cam blank and work carrying plate are secured on the end of the spindle by a clamping bolt 10 and nut 11, and the plate is connected to rotate with the spindle by a key 12. By this arrangement of the work carrying spindle the periphery of the cam blank 8 may be presented to an ordinary mill 13 secured directly in the spindle 5 of the milling machine.

In order that the desired rise may be cut upon the cam blank, mechanism is provided for connecting the work carrying spindle with the feed screw 14 of the feed table so that rotation of the work spindle is accompanied by a predetermined longitudinal movement of the feed table. This connecting mechanism includes variable speed gearing through which the ratio between the rotation of the work spindle and the feed table may be varied in accordance with the rise which it is desired to cut on the cam blank. The mechanism is preferably so constructed that the change gears which are ordinarily used for connecting the feed screw of the milling machine with a spiral head may be utilized as the variable speed mechanism. It is also preferred to provide means for operating the connecting mechanism manually, and to so construct this means that it may be disconnected when it is desired to use the power feed of the machine. It is also preferred to provide the connecting mechanism with a clutch through which the connections between the feed screw and the work spindle may be broken when it is desired to cut a dwell on the cam blank, or when it is desired to feed the table longitudinally without rotating the cam blank, as when cutting radially of the cam blank.

In the construction shown, mechanism for connecting the feed screw of the milling machine table with the work spindle comprises a shaft 15 connected at one end with the work spindle through beveled gears 16 and 17. The other end of the shaft carries a worm wheel 18 which is recessed to form one member of a friction clutch. The other member of the friction clutch comprises a split spring ring 19 held within the recess in the worm wheel by an annular ring 20. This split clutch ring is operated through a wedge shaped arm 21 carried by a sleeve 22 which is keyed to rotate with and slide on the end of a second shaft 23. The sleeve 22 may be moved on the shaft 23 to engage or disengage the clutch members by a hand lever 24 which is provided with a yoke at its lower end and is connected with the sleeve by pins 25 engaging an annular groove in the sleeve. The shaft 23 may be connected with the feed screw 14 of the milling machine table through a series of change gears 26 of any usual and well known construction. As shown, the change gears comprise a gear removably secured to the feed screw 14 by a handle 27 the hub of which is screwed on to the end of the shaft, a gear removably secured on the shaft 23 by a nut screwed on to the end of the shaft, and an intermediate gear removably held on a stud by a nut. By interchanging these gears or replacing them with others, the relative speeds of the shaft and feed screw may be varied, and these gears are one form of variable speed gearing for connecting the shaft and feed screw. When the clutch members are engaged by shifting the hand lever 24 toward the right in Fig. 1, the work spindle 4 and feed screw 14 are connected so that movement is simultaneously imparted to the table and work spindle.

Motion may be imparted to the table and spindle by turning the feed screw 14 through the handle 27 or through the power feed mechanism with which the milling machine is provided. When the clutch members are disconnected by moving the hand lever toward the left in Fig. 1, connection between the feed screw and work spindle is broken, and the work spindle may be rotated without changing the position of its axis with relation to the cutter, and thus a dwell or concentric portion may be cut on the periphery of the cam blank. The means for rotating the work spindle when the clutch is disconnected consists in the construction shown of a worm 28 arranged to engage the worm wheel 18 and secured to a shaft 29 which extends transversely of the base 1. The rear end of the shaft 29 is supported in a bearing 30 which is pivoted at 31; and the front end of the shaft is supported in a bearing block 32 which rests upon a support 33 when the worm is in engagement with the worm wheel. The front end of the shaft is provided with a crank handle 34 which may be operated to impart movement to the work spindle. This mechanism may also be used as a hand feed for operating the work spindle and table when cutting rises. If the mechanism is to be driven through the feed screw when cutting rises on the cam blank, the worm 28 should be disengaged from the worm wheel, since it would otherwise lock the worm wheel against rotation. The bearing block 32 is accordingly mounted so that it may be moved back to disengage it from the support 33, thus allowing the shaft 29 to swing down and disengage the worm from the worm wheel. The bearing block is forced forward by a spring 35, and the block is provided with a stop shoulder 36 for limiting its forward movement and holding it in engagement with the support 33.

In order that the operator may readily determine what part of the cam blank the cutter is operating upon, the work spindle is provided at its forward end with a graduated disk 37 and the bearing 38 within which the disk rotates is provided with zero marks 39 on diametrically opposite sides of the spindle, the zero marks corresponding to the position of the cutter when operating either at the right or left side of the cam blank. An indicator finger 40 is frictionally held on the hub of the disk 37, and may be adjusted in accordance with the position of the cutter at the right or left side of the work spindle.

While the invention has been shown and described as embodied in an attachment for milling machines, it will be understood that it is not limited in its application to an attachment of this character, and that certain features of the invention may be embodied with advantage in machines specially designed for cutting cams.

While it is preferred to employ the specific construction and arrangement of parts shown and described, it will be understood that this construction and arrangement is not essential to the broader features of the invention, and may be varied or modified within the scope of the claims without departing therefrom.

Having explained the nature and object of the invention, and specifically described one form of mechanism in which it may be embodied, what I claim is:—

1. A cam cutting attachment for milling machines, having, in combination, a base adapted to be secured to a milling machine table, a work carrying spindle mounted on the base with its axis transverse to the line of feed of the table, mechanism for connecting the work spindle with the feed screw of the milling machine table including means for breaking the connection and means for manually operating the work spindle, substantially as described.

2. A cam cutting attachment for milling machines, having, in combination, a base adapted to be secured to a milling machine table, a work carrying spindle mounted on the base with its axis transverse to the line of feed of the table, mechanism for connecting the work spindle with the feed screw of the milling machine table including variable speed gearing and means for making and breaking the connection, and means for manually operating the work spindle, substantially as described.

3. A cam cutting attachment for milling machines, having, in combination, a base adapted to be secured to a milling machine table, a work carrying spindle mounted on the base with its axis transverse to the line of feed of the table, mechanism for connecting the work spindle with the feed screw of the milling machine table including a clutch for making and breaking the connection, and means connected with said mechanism intermediate the clutch and the work spindle for manually operating the work spindle, substantially as described.

4. A cam cutting attachment for milling machines, having, in combination, a base adapted to be secured to a milling machine table, a work carrying spindle mounted on the base with its axis transverse to the line of feed of the table, mechanism for connecting the work spindle with the feed screw of the milling machine table including variable speed gearing and a clutch for making and breaking the connection, substantially as described.

5. A cam cutting attachment for milling machines, having, in combination, a base adapted to be secured to a milling machine table, a work carrying spindle mounted on the base, a shaft geared to the work spindle, a worm wheel on the shaft, a manually operated shaft provided with a worm engaging the worm wheel, a third shaft connected through variable speed gearing with the feed screw of the milling machine table, a clutch for connecting and disconnecting the first and third shaft, and means for engaging and disengaging the worm and worm wheel substantially as described.

6. A cam cutting attachment for milling machines, having, in combination, a base adapted to be secured to a milling machine table, a work carrying spindle mounted on the base with its axis transverse to the line of feed of the table, a shaft on the base extending parallel to the feed screw of the milling machine table, gearing connecting the shaft and work spindle, a worm wheel on the shaft, a manually operated shaft with a worm engaging the worm wheel, a third shaft on the base in line with the shaft carrying the worm wheel, a friction clutch for connecting and disconnecting said first and third shafts, and variable speed gearing connecting the third shaft with the feed screw, substantially as described.

7. A cam cutting mechanism, having, in combination, a cutter spindle, a work carrying table, mechanism for relatively feeding the table and cutter spindle transversely of the spindle, a work spindle mounted on the table with its axis parallel to the axis of the cutter spindle, mechanism for connecting the work spindle with the feed mechanism including means for breaking the connection, and means for operating the work spindle when the connection is broken, substantially as described.

8. A cam cutting mechanism, having, in combination, a cutter spindle, a work supporting table, mechanism for feeding the table transversely of the cutter spindle, a work carrying spindle mounted on the table with its axis parallel to the axis of the cutter spindle, mechanism for connecting the work spindle with the feed mechanism for the table including variable speed gearing and means for making and breaking the connection, and means for manually operating the work spindle, substantially as described.

9. A cam cutting mechanism, having, in combination, a cutter spindle, a work spindle arranged with its axis parallel to the axis of the cutter spindle, mechanism for relatively feeding the spindles transversely of their axes, and mechanism for rotating the work spindle connecting the work spindle with the feed mechanism, substantially as described.

GEORGE D. HAYDEN.

Witnesses:
CECIL C. HEYWORTH,
H. C. MORRISON.